US006308591B1

(12) United States Patent
Dankow et al.

(10) Patent No.: US 6,308,591 B1
(45) Date of Patent: Oct. 30, 2001

(54) CONTROL ROD

(75) Inventors: Mark W. Dankow, Fort Wayne; Christopher W. Forrest, Auburn; Vincent Mastrangelo, Fort Wayne, all of IN (US); Thomas Sholeen, Western Springs, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/388,986

(22) Filed: Sep. 2, 1999

(51) Int. Cl.[7] .................................................. F16C 7/02
(52) U.S. Cl. .............................. 74/588; 74/579 R; 74/593
(58) Field of Search .................................. 74/579 R, 580, 74/586, 587, 588, 593, 594, 579 E, 579 F; 280/124.134

(56) References Cited

U.S. PATENT DOCUMENTS

| | | |
|---|---|---|
| 362,008 | 4/1887 | Hodges . |
| 1,260,566 | 3/1918 | Mathias . |
| 1,318,611 | 10/1919 | Shaffer . |
| 1,418,084 * | 5/1922 | Layman ................... 74/588 |
| 1,481,981 | 1/1924 | Boye . |
| 1,652,677 | 12/1927 | McCoy et al. . |
| 1,839,680 * | 1/1932 | Hudson ................... 74/587 |
| 1,879,814 | 9/1932 | Morgan et al. . |
| 2,213,690 | 9/1940 | Caldwell . |
| 2,658,241 | 11/1953 | Houghton, Jr. et al. . |
| 2,859,047 | 11/1958 | Easton . |
| 3,284,103 | 11/1966 | Polzin et al. . |
| 3,869,015 | 3/1975 | Allison . |
| 4,080,084 | 3/1978 | Williams . |
| 4,480,498 * | 11/1984 | Konig ................... 74/588 X |
| 4,557,622 | 12/1985 | Chalmers . |
| 4,986,566 | 1/1991 | Nishino et al. . |
| 5,169,055 | 12/1992 | Peterson et al. . |
| 5,662,348 * | 9/1997 | Kusama et al. ........ 280/124.134 |

FOREIGN PATENT DOCUMENTS

| | | | |
|---|---|---|---|
| 214050 * | 11/1957 | (AU) ................... 74/579 R |
| 12118 * | of 1912 | (GB) ................... 74/588 |
| 894179 * | 4/1962 | (GB) ................... 74/579 E |

OTHER PUBLICATIONS

Obberg et al., *Machinery's Handbook*, pp. 118–119, 24th ed., Industrial press, Inc., New York. Date Unknown.

Hibbeler, *Mechanics of Materials*, p. 29, MacMillan PUblishing Co., New York. Date Unknown.

* cited by examiner

*Primary Examiner*—Mary Ann Green
(74) *Attorney, Agent, or Firm*—Cook, Alex, McFarron, Manzo, Cummings & Mehler, Ltd.

(57) ABSTRACT

A fabricated control rod having a spacer with a "C" or "U-shaped" channel cross-section. The spacer also has a bushing tube welded to each of its ends. Each end of the spacer is shaped to have a substantially continuous mating engagement with the exterior side surface of the adjacent bushing tube. Also, at least a substantially complete perimeter weld joins both the interior and exterior of each shaped end to the bushing tube.

29 Claims, 1 Drawing Sheet

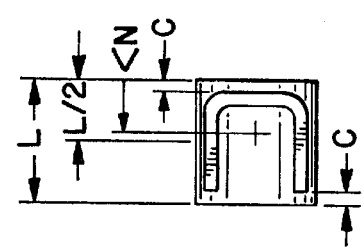
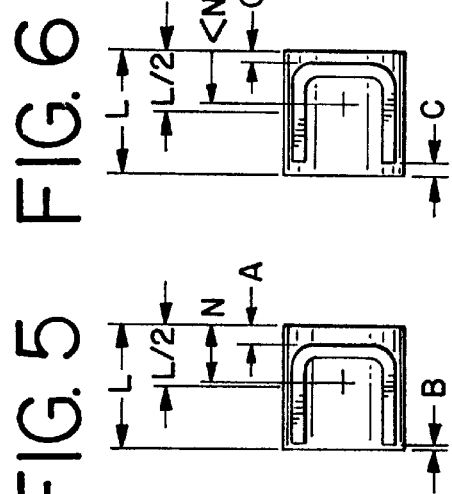
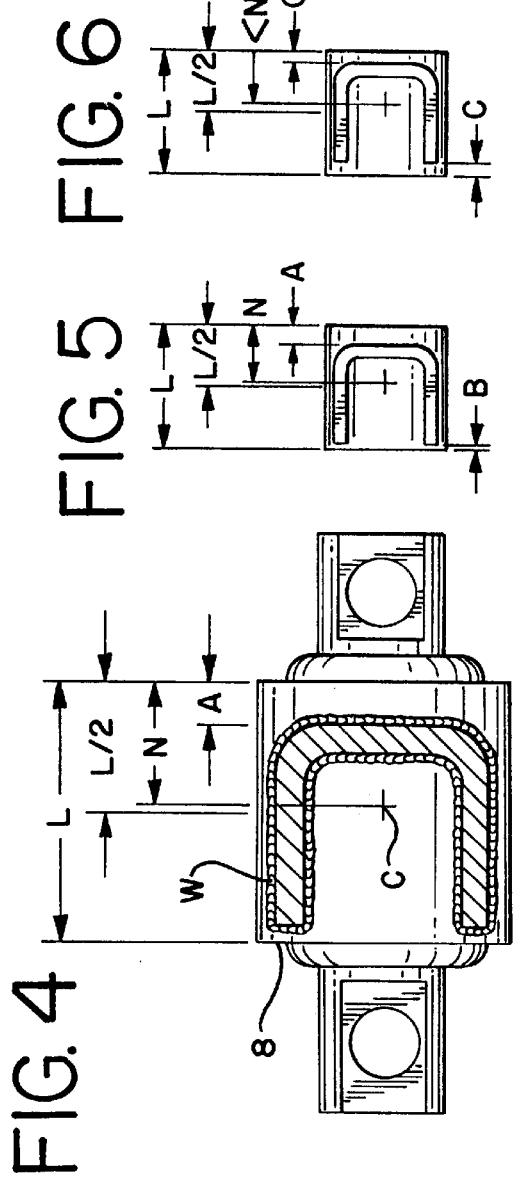
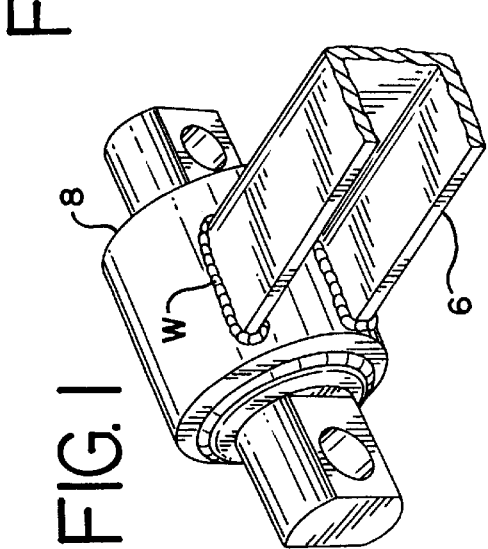
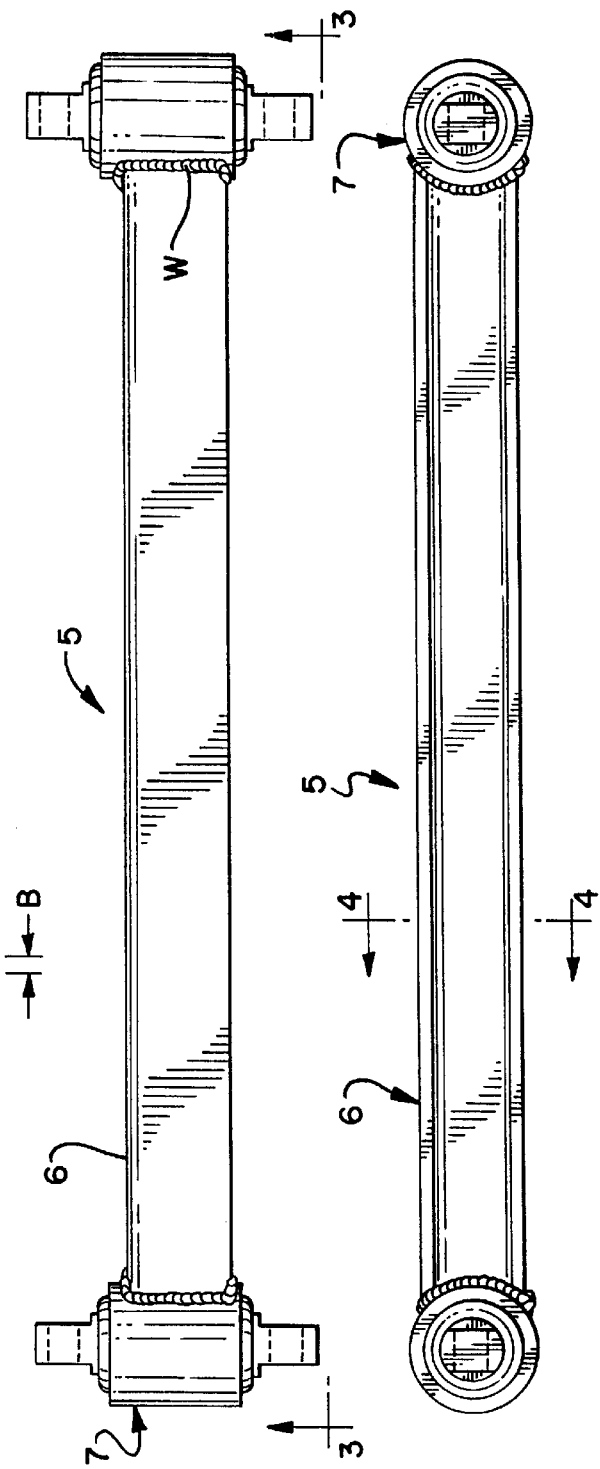

CONTROL ROD

BACKGROUND OF THE INVENTION

Control rods are well known components of heavy truck suspensions wherein they are widely used as torque rods and referred to as "torque rods". The present invention relates to new and improved control rods particularly suited for heavy truck suspensions wherein control rods have been a standard component for over seventy-five years. A control rod is a linkage, which transmits longitudinal and transverse forces from the axle to the frame or suspension component of a vehicle such as a heavy duty truck. The forces acting on the ends of a control rod linkage include torsion, radial, axial and conical patterns as described in SAE J 1183, Elastomeric Bushing TRAC.

The control rods provided by the present invention are characterized by having a spacer rod, which is generally C or U-shaped in cross-section, to the opposite ends of which bushing tubes are welded. The opposite ends of the spacer rod are shaped or contoured so as to have mating or line engagement with the exterior side surface of the bushing tube which is welded to each end of the spacer rod. The welds joining each end of the spacer rod to the bushing tubes are at least substantially complete in that they follow the interior and exterior of each end of the spacer rod. By reason of their C or U-shaped open cross-section the spacer rods have excellent strength on the basis of their weight and permit at least the substantially complete perimeter welds that join their opposite ends to the bushing tubes and thereby provide maximum strength.

Accordingly, the object of the invention generally stated is the provision of new and improved control rods for truck suspensions and other uses, which are economical to make in a variety of sizes utilizing readily available production procedures and equipment. Specifically, the invention applies to low volumes of multiple length low volume control rods.

For a more complete understanding of the nature and scope of the invention reference may now be had to the following detailed description of one embodiment taken in conjunction with the accompanying drawings wherein:

DESCRIPTION OF THE DRAWINGS

FIG. 1 is a fragmentary perspective view of one end of a control rod embodying the present invention and showing the end of the rod component or member welded to a bushing tube;

FIG. 2 is a plan view of a control rod embodying the invention;

FIG. 3 is an elevational view of the control rod taken on line 3—3 of FIG. 2;

FIG. 4 is a enlarged sectional view taken on line 4—4 of FIG. 3;

FIG. 5 is a diagrammatic view showing the optimum location of each end of the spacer rod component with respect to axial loading and to the bushing tube to which it is welded; and FIG. 6 is a diagrammatic view showing an end of the spacer rod component geometrically centered with respect to a bushing tube.

DETAILED DESCRIPTION OF THE INVENTION

Referring to FIGS. 1–4 a control rod embodying the present invention is indicated generally at 5 therein comprising a spacer 6 to the opposite ends of which bushing tubes 7 are secured by welding. The spacer component 6 shown has a C or U-shaped crosss-section. Each end of the spacer 6 is shaped or contoured so as to have line contact or engagement with the cylindrical side surfaces of the bushing tubes 8 which contain each bushing 7. It will be noted from FIGS. 1–4 and particularly FIG. 4 that the weld W that joins each end of the spacer 6 to a bushing tube 8 is complete or at least substantially complete (i.e. endless) following both the interior and exterior line of engagement between the end of the spacer rod and the side surface of the bushing tube. By reason of the complete perimeter weld W being substantially complete on both the interior and exterior of the spacer 6 the joinder of the spacer rod 6 to the bushing tubes 8 the weld is appreciably stronger than if the spacer 6 were hollow in the form of a tube and the weld was thereby confined to the exterior only. Thus, the open-section geometry allows a material increase in the effective weld length as compared to closed sections of equivalent cross-sectional areas and package space. In addition, the chances of shear weld failure from axial loading are at least nearly eliminated due to the weld symmetry. Axial loading is common for longitudinal control rod designs used on heavy trucks during braking and acceleration as well as transverse control rod designs during cornering.

It has been ascertained that the position or geometry of the location of the end of a spacer 6 to a bushing tube 8 is important in providing an optimized section and weld design therebetween. Specifically, it has been ascertained that the center-of-mass or channel neutral axis of the spacer rod 6 should be at or juxtaposed to the geometrical center of the bushing tube 8 as shown in FIGS. 4 and 5. In FIG. 4 the center-of-mass is indicated at C. In FIG. 4 the point C is located midway between the top and bottom of bushing tube 8 but slightly horizontally offset to the right of the midpoint between the open side and closed side of the bushing tube 8. The small offset to the right is equal to the dimension L/2 minus the small distance N which is necessary to complete welding across the material thickness. It will be seen from FIGS. 4 and 5 that the distance A between the closed or rear side of the spacer 6 and the adjacent side of the bushing tube 8 is appreciably greater than the distance B between the open ends of the spacer rod and the adjacent side of the bushing tube. The relative positioning of the end of the spacer rod 6 and bushing tube 8 illustrated in FIGS. 4 and 5 substantially aligns the axial force vector with the channel center-of-mass thereby minimizing bending stress effects and approaching the pure axial load observed in closed section rods. As a result, the open section control rod life is appreciably increased in axial loading while remaining compliant in torsion. Compliance in torsion is not generally observed on conventional closed section rods used in heavy truck torque rod applications. As a result, such torque rod bushings 7 tend to fail much earlier in service and often dictate excessive rebushing costs or control rod replacement depending on the end user. Control rods having open channel cross-section spacer rods in accordance with the present invention are generally over twice as compliant torsionally and thereby extend bushing service life and save end user cost.

The geometric relationship between the spacer 6 and the bushing tube 8 in FIG. 5 corresponds to the positioning shown in FIG. 4. However, in FIG. 6 which corresponds in scale to FIG. 5 the spacer rod 6 is geometrically centered or positioned with respect to the side of the bushing tube to which it is joined. Thus the spacer rod 6 in FIG. 6 is centered both with respect to the top and bottom of the bushing tube as well as with respect to the vertical sides of the bushing tube. Accordingly the distances C are equal in FIG. 6.

A free body diagram analysis has been conducted in known manner to compare the axial stress of control rods having the spacer component 6 joined to the bushing tubes 8 as shown in FIGS. 4 and 5 on one hand and in FIG. 6 on the other hand. According to such free body diagram analysis a control rod conforming to FIGS. 4 and 5 exhibits twenty-five percent less stress in axial loading than a control rod conforming to FIG. 6.

The procedure used in locating the center-of-mass or center of gravity of the spacer 6 at or juxtaposed to the geometrical center of the bushing tube 8 according to FIGS. 4 and 5 prior to welding is well known and is described, for example, in Machinery's Handbook, Industrial Press Inc., New York, 24th Edition at page 119.

The spacer components 6 of the control rods 5 may be cut to length from standard C or U-shaped rods. Alternately, they can be readily formed from sheet metal stock which is formed to desired cross-sectional dimensions and shape. Known low cost sheet metal forming practices and equipment may be used in forming the rods with C or U-shaped cross sections.

The weld W (FIG. 4) can be formed using known welding equipment and procedures. The weld W can be made either in several steps or in a continuous manner. In any case it must be substantially complete in order to achieve optimum results.

What is claimed is:

1. A fabricated control rod for transmitting forces from a vehicle axle to at least one of a vehicle frame and vehicle suspension component, comprising:

spacer having a generally uniform C or U-shaped channel cross-section along its length and having first and second C or U-shaped ends;

a first bushing tube having an exterior side surface welded to said first C or U-shaped end of said spacer, said first C or U-shaped end of said spacer being shaped to have an interior and an exterior, said first C or U-shaped end of said spacer further being shaped to have a substantially continuous mating engagement with the exterior side surface of said first bushing tube, and at least a substantially complete perimeter weld along both the interior and exterior of said first C or U-shaped end of said spacer to join the first end to said first bushing tube; and a second bushing tube having an exterior side surface welded to said second C or U-shaped end of said spacer, said second C or U-shaped end of said spacer being shaped to have an interior and an exterior, said second C or U-shaped end of said spacer further being shaped to have a substantially continuous mating engagement with the exterior side surface of said second bushing tube, and at least a substantially complete perimeter weld along both the interior and exterior of said second C or U-shaped end of said spacer to join the second end to said second bushing tube.

2. The fabricated control rod as defined by claim 1 wherein said spacer has a center-of-mass, said exterior side surface of said first bushing tube has a geometrical center, and said center-of-mass of said spacer is at said geometrical center of said exterior side surface of said first bushing tube.

3. The fabricated control rod as defined by claim 1 wherein said spacer has a center-of-mass, said exterior side surface of said second bushing tube has a geometrical center, and said center-of-mass of said spacer is at said geometrical center of said exterior side surface of said second bushing tube.

4. The fabricated control rod as defined by claim 1 wherein said spacer has a center-of-mass, said exterior side surface of said first bushing tube has a geometrical center, and said center-of-mass of said spacer is juxtaposed to said geometrical center of said exterior side surface of said first bushing tube.

5. The fabricated control rod as defined by claim 1 wherein said spacer has a center-of-mass, said exterior side surface of said second bushing tube has a geometrical center, and said center-of-mass of said spacer is juxtaposed to said geometrical center of said exterior side surface of said second bushing tube.

6. The fabricated control rod as defined by claim 1 wherein a single weld joins said first end of said spacer to said first bushing tube.

7. The fabricated control rod as defined by claim 6 wherein a single weld joins said second end of said spacer to said second bushing tube.

8. A fabricated control rod for transmitting forces from a vehicle axle to at least one of a vehicle frame and vehicle suspension component, comprising:

a spacer having a generally uniform C or U-shaped channel cross-section along its length and having a first C or U-shaped end and a second C or U-shaped end, said first C or U-shaped end having a perimeter defined by an outline of its shape and said second C or U-shaped end also having a perimeter defined by an outline of its shape;

a first bushing tube having an exterior side surface welded to said first C or U-shaped end of said spacer by a substantially complete perimeter weld along the perimeter of said first C or U-shaped end of said spacer to join said first end of said spacer to said first bushing tube; and a second bushing tube having an exterior side surface welded to said second C or U-shaped end of said spacer by a substantially complete perimeter weld along the perimeter of said second C or U-shaped end of said spacer to said second bushing tube.

9. The fabricated control rod as defined by claim 8 wherein said spacer has a center-of-mass, said exterior side surface of said first bushing tube has a geometrical center, and said center-of-mass of said spacer is at said geometrical center of said exterior side surface of said first bushing tube.

10. The fabricated control rod as defined by claim 9 wherein said exterior side surface of said second bushing tube has a geometrical center, and said center-of-mass of said spacer is also at said geometrical center of said exterior side surface of said second bushing tube.

11. The fabricated control rod as defined by claim 8 wherein said spacer has a center-of-mass, said exterior side surface of said first bushing tube has a geometrical center, and said center-of-mass of said spacer is juxtaposed to said geometrical center of said exterior side surface of said first bushing tube.

12. The fabricated control rod as defined by claim 11 wherein said exterior side surface of said second bushing tube has a geometrical center, and said center-of-mass of said spacer is juxtaposed to said geometrical center of said exterior side surface of said second bushing tube.

13. The fabricated control rod as defined by claim 8 wherein a single weld joins said first end of said spacer to said first bushing tube.

14. The fabricated control rod as defined by claim 13 wherein a single weld joins said second end of said spacer to said second bushing tube.

15. A fabricated control rod for transmitting forces from a vehicle axle to at least one of a vehicle frame and vehicle suspension component, comprising:

a spacer having a C or U-shaped channel cross-section wherein said C or U-shape of said cross-section includes an open end and a closed end and wherein said spacer has a first C or U-shaped end and a second C or U-shaped end;

a first bushing tube welded to said spacer at said first C or U-shaped end and defining a first bushing tube bore having a first bushing tube bore axis that extends in a direction parallel to a direction generally defined by a line extending from said open end of said cross-section to said closed end of said cross-section; and a second bushing tube welded to said spacer at said second C or U-shaped end and defining a second bushing tube bore having a second bushing tube bore axis that extends in a direction parallel to said first bushing tube bore axis.

16. The fabricated control rod as defined by claim 15 wherein said first bushing tube has an exterior side surface, said spacer has a center-of-mass, and said exterior side surface of said first bushing tube has a geometrical center coincident with said center-of-mass of said spacer.

17. The fabricated control rod as defined by claim 16 wherein said second bushing tube has an exterior side surface, and said exterior side surface of said second bushing tube has a geometrical center coincident with said center-of-mass of said spacer.

18. The fabricated control rod as defined by claim 15 wherein said first bushing tube has an exterior side surface, said spacer has a center-of-mass, and said exterior side surface of said first bushing tube has a geometrical center juxtaposed to said center-of-mass of said spacer.

19. The fabricated control rod as defined by claim 18 wherein said second bushing tube has an exterior side surface, and said exterior side surface of said second bushing tube has a geometrical center juxtaposed to said center-of-mass of said spacer.

20. The fabricated control rod as defined by claim 15 wherein a single weld joins said first end of said spacer to said first bushing tube.

21. The fabricated control rod as defined by claim 20 wherein a single weld joins said second end of said spacer to said second bushing tube.

22. A fabricated control rod assembly for transmitting forces from a vehicle axle to at least one of a vehicle frame and vehicle suspension component, comprising:

a spacer having a generally uniform C or U-shaped channel cross-section along its length and having first and second C or U-shaped ends;

a first bushing tube having an exterior side surface welded to said first C or U-shaped end of said spacer, said first C or U-shaped end of said spacer being shaped to have an interior and an exterior, said first C or U-shaped end of said spacer further being shaped to have a substantially continuous mating engagement with the exterior side surface of said first bushing tube, and at least a substantially complete perimeter weld along both the interior and exterior of said first C or U-shaped end of said spacer to join the first end to said first bushing tube;

a second bushing tube having an exterior side surface welded to said second C or U-shaped end of said spacer, said second C or U-shaped end of said spacer being shaped to have an interior and an exterior, said second end of said spacer further being shaped to have a substantially continuous mating engagement with the exterior side surface of said second bushing tube, and at least a substantially complete perimeter weld joining both the interior and exterior of said second end of said spacer to said second bushing tube;

means positioned within said first bushing tube for connecting said fabricated control rod to a vehicle axle; and means positioned within said second bushing tube for connecting said fabricated control rod to at least one of a vehicle frame and vehicle suspension component.

23. A fabricated control rod for transmitting forces from a vehicle axle to at least one of a vehicle frame and vehicle suspension component, comprising:

a spacer having a generally uniform C or U-shaped channel cross-section along its length wherein said C or U-shape of said cross-section includes an open end and a closed end and wherein said spacer has a first C or U-shaped end and a second C or U-shaped end;

a first bushing tube welded to said spacer at said first C or U-shaped end and defining a first bushing tube bore having a first bushing tube bore axis that extends in a direction parallel to a direction generally defined by a line extending from said open end of said cross-section to said closed end of said cross-section; and a second bushing tube welded to said spacer at said second C or U-shaped end and defining a second bushing tube bore having a second bushing tube bore axis that extends in a direction parallel to said first bushing tube bore axis.

24. The fabricated control rod as defined by claim 23 wherein said first bushing tube has an exterior side surface, said spacer has a center-of-mass, and said exterior side surface of said first bushing tube has a geometrical center coincident with said center-of-mass of said spacer.

25. The fabricated control rod as defined by claim 24 wherein said second bushing tube has an exterior side surface, and said exterior side surface of said second bushing tube has a geometrical center coincident with said center-of-mass of said spacer.

26. The fabricated control rod as defined by claim 23 wherein said first bushing tube has an exterior side surface, said spacer has a center-of-mass, and said exterior side surface of said first bushing tube has a geometrical center juxtaposed to said center-of-mass of said spacer.

27. The fabricated control rod as defined by claim 26 wherein said second bushing tube has an exterior side surface, and said exterior side surface of said second bushing tube has a geometrical center juxtaposed to said center-of-mass of said spacer.

28. The fabricated control rod as defined by claim 23 wherein a single weld joins said first end of said spacer to said first bushing tube.

29. The fabricated control rod as defined by claim 28 wherein a single weld joins said second end of said spacer to said second bushing tube.

* * * * *